United States Patent [19]

Lowe et al.

[11] Patent Number: 4,860,929
[45] Date of Patent: Aug. 29, 1989

[54] DISPENSING DEVICE FOR SOLUBLE GRANULAR MATERIALS

[76] Inventors: Christopher H. Lowe, 21 Charleston Court, Forrestfield, Furnace Green, Crawley, Sussex; Nicholas J. Allen, Flat 2, 23 Hampstead Lane, Highgate, London N6, both of England

[21] Appl. No.: 133,534

[22] Filed: Dec. 16, 1987

[30] Foreign Application Priority Data

Dec. 16, 1986 [GB] United Kingdom ............... 8629966

[51] Int. Cl.⁴ .................... A47J 31/00; B65B 29/02
[52] U.S. Cl. .................................... 222/189; 99/295; 99/323; 206/0.5; 426/77; 426/85
[58] Field of Search ............... 222/189, 92, 192; 99/323, 295; 206/0.5; 239/33; 426/77, 85

[56] References Cited

U.S. PATENT DOCUMENTS

| | | | |
|---|---|---|---|
| 214,617 | 4/1879 | Brown | 239/33 |
| 790,626 | 5/1905 | French | 99/323 |
| 1,489,806 | 4/1924 | Anderson | 426/77 |
| 2,859,515 | 11/1958 | Kinman | 239/33 |
| 2,901,357 | 8/1959 | Epstien | 426/85 |
| 3,102,465 | 9/1963 | Montesano | 206/0.5 |
| 3,154,418 | 10/1964 | Lovell et al. | 206/0.5 X |
| 3,946,652 | 3/1976 | Gorin | 99/295 X |
| 4,388,338 | 7/1982 | Popkes | 99/323 X |
| 4,465,697 | 8/1984 | Brice | 99/295 X |
| 4,518,082 | 5/1985 | Ye | 206/0.05 X |
| 4,658,990 | 4/1987 | Ramage | 222/106 |

*Primary Examiner*—Joseph J. Rolla
*Assistant Examiner*—Gregory L. Huson
*Attorney, Agent, or Firm*—Poms, Smith, Lande & Rose

[57] ABSTRACT

A dispensing device for a soluble granular material is disclosed, which device comprises a tube formed of a liquid-impermeable material and of unitary construction, the tube being closed at both ends and having perforations along a portion of its length at or close to one end, and containing a soluble granular material. Preferably the lower end of the tube has a flattened, paddle-like portion, and the perforations are arranged linearly along opposite sides of the tube aligned with the edges of this flattened portion.

3 Claims, 2 Drawing Sheets

DISPENSING DEVICE FOR SOLUBLE GRANULAR MATERIALS

BACKGROUND OF THE INVENTION

This invention relates to a dispensing device for soluble granular materials and, more particularly, relates to such a device in the form of an elongate tubular device of unitary construction sealed at both ends.

Telescopic tubular packaging/infusion units are known. For example, U.S. Pat. No. 3,102,465 discloses a packaging/infusion unit which comprises two parts, one being a sheath element permanently closed at one end and accommodating, via its other end, a foraminate charge-holding element. The latter may be completely retracted into the sheath element, and the device in this configuration may be sealed by a closure cap. Devices of this type are relatively complicated to fabricate and have not found acceptance in the market place. Although U.S. Pat. No. 3,102,465 issued on Sept. 3, 1963, there have not to our knowledge been any developments in the interim period which have enabled tubular packaging/infusion devices to gain market acceptance.

SUMMARY OF THE INVENTION

An object of the present invention is to provide a tubular dispensing device which is simpler to produce than the packaging/infusion unit disclosed in U.S. Pat. No. 3,102,465.

According to one aspect of the present invention, there is provided a dispensing device for soluble granular materials, which device comprises a tube formed of a liquid-impermeable material and of unitary construction, the tube being closed at both ends and having perforations along a portion of its length at or close to one end, and containing a soluble granular material. The solvent for the soluble granular material will in practice often be water, but the invention is not limited to granular materials which are water-soluble.

It will be appreciated that the grain size of the granular material and the size of the perforations are selected so that the granular material is prevented from spilling out via the perforations.

DESCRIPTION OF THE PREFERRED EMBODIMENTS

Figure 1:
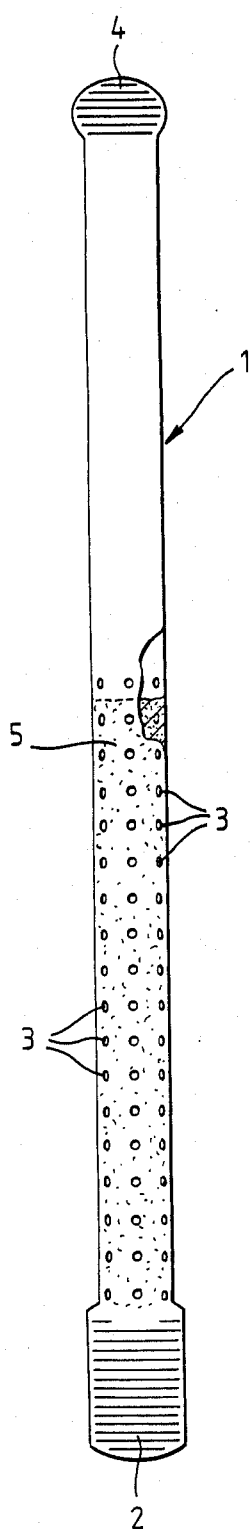

Preferably, a device in accordance with this invention resembles and/or is formed from a drinking straw (e.g. formed of a synthetic polymeric material such as polyethylene or polypropylene). In order to fabricate a device in accordance with this invention, such a straw may first be sealed at one end, e.g. by clamping the end of the tube between hot metal plates. Next the granular material is poured into the straw after which the open end is sealed, for example by clamping it between hot plates. Perforations are provided along a portion of the length of the straw, and these will usually be formed prior to the filling of the straw with granulr material. The ease of fabrication of the device will thus be readily appreciated.

Preferably, the lower, sealed end of the tube has a flattened portion, and the perforations in the tube are located along the sides of the tube where an imaginary extension of the flattened end portion would intersect with the sides of the tube. There may in addition be further perforations adjacent to the flattened end portion. We have found that such an arrangement does not retard the rate of dissolution of, for example, sugar when the dispenser is used, but has the added advantage that is prevents drips or spillage when the dispenser is laid flat after use. Where the perforations are arranged in lines as just described, the dispenser of the invention lends itself to fabrication by a laser drilling technique. For example, an open ended tube of the desired length and diameter may first of all have one end (the lower end) sealed by a hot clamping technique which also serves to form the flattened portion, after which the tube may be drilled in the desired locations by laser, then filled with the intended soluble, granular material (e.g. sugar or soluble coffee granules) and its other (upper) end sealed. Thus the dispenser can be manufactured by a simple, linear production scheme. If desired, the initial tube may be fabricated at the beginning of the line, e.g. by extruding, drawing or moulding a plastics material.

The invention is expected to find its main application for use as a sweetening device. When the soluble granular material is sugar or an artificial sweetener, e.g. saccharin, in finely divided form, a device of this invention when stirred into a cup containing a beverage such as tea or coffee results in rapid dissolution of the sweetener and its dispersion, via the perforations, into the beverage. To aid dispersion of the sweetener or other granular material, that end of the device adjacent the perforations may be flattened (e.g. during the clamping operation described above) to provide a paddle-like portion.

Preferably, the perforations extend over about 3–8 cm of the length of the device. Conveniently, the device will be 10–20 cm in length, and from 3–15 mm (typically about 8 mm) in diamter.

BRIEF DESCRIPTON OF THE DRAWINGS

Figure 3:
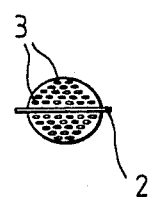
Figure 2:
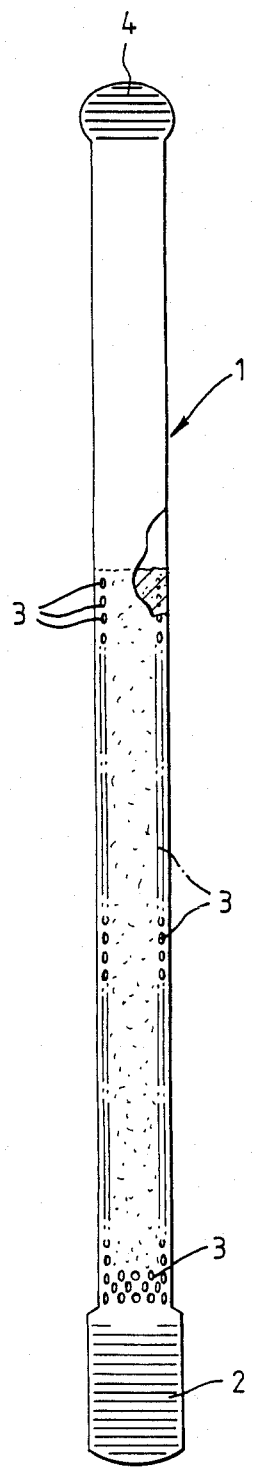

For a better understanding of the invention, and to show how the same may be carried into effect, reference will now be made, by way of example, to the accompanying drawings, in which:

FIG. 1 illustrates a first embodiment of the invention;
FIG. 2 show a second embodiment of the invention;
FIG. 3 is an end elevation of the article shown in FIG. 2; and
FIG. 4 is a view of the article of FIG. 2 rotated about its longitudinal axis through 90°.

DETAILED DESCRIPTION

Referring first to FIG. 1, the dispenser in accordance with the invention comprises a plastics straw 1 sealed at its bottom end 2 by a hot clamping device and having, adjacent to the sealed end 2, a series of perforations 3. These extend approximately half way along the length of the straw. As will be apparent, the end 2 of the device is flattened and constitutes a paddle which assists in stirring the beverage with which the device is used. The upper end 4 of the straw is also heat-sealed. A fine granular material 5, e.g. sugar or saccharin, is encapsulated within the straw.

Figure 4:
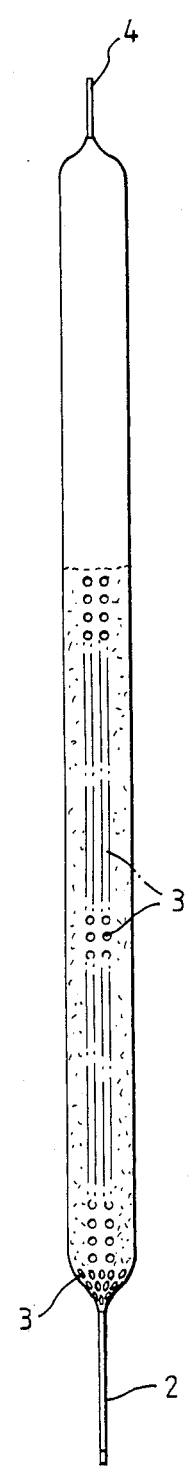

The embodiment of FIGS. 2, 3 and 4 is similar to that of FIG. 1 except in the location of the perforations; the same reference numerals are used to denote the same features throughout. In the embodiment of FIG. 2, the perforations 3 are located only along opposite sides of the tube 1 and are aligned with the edges of the flattened paddle 2, with additional holes 3 immediately adjacent to end 2 (see FIGS. 3 and 4). As described earlier, this arrangement is preferred because it is more hygienic in that because of capillary action drops of liquid do not spill out when the dispenser is laid onto a surface after use.

In use, the device is held close to its upper end 4 and is inserted into a beverage in the manner of a spoon. By producing a stirring action, the granular material 5 within the device rapidly dissolves as a result of contact through perforations 3, and is dispersed into the beverage. Because of its light weight and relatively inexpensive nature, the device is intended to be discarded after use.

We claim:

1. A dispensing device for a soluble granular material comprising:

an elongated cylindrical plastic tube of continuous unitary thin walled plastic construction as found in a straw;

said tube having a diameter of between 0.3 and 1.5 centimeters and said tube having a length of between 10 and 20 centimeters;

said tube having first and second ends, said first end being heat sealed and formed into a flat paddle, having a transverse extent greater than the diameter and a thickness of substantially twice the wall thickness of said tube and constituting means for stirring a liquid, and said second end being sealed;

particulate material within said tube adjacent said first end thereof;

said tube having perforations through the side wall thereof in two zones only, the first directly adjacent said first end and the second at diametrically opposite sides of the tube extending longitudinally on the tube and aligned in a plane defined by the paddle to permit fluid engagement with said particulate material when immersed in fluid and prevent leakage of residual fluid from the tube when laid on a horizontal surface after use;

whereby said dispenser may be immersed in a cup of hot liquid and said particulate material dispensed into said hot liquid, with said paddle serving to stir said liquid.

2. A dispensing device as set forth in claim 1 wherein the body of said tube is in the form of a plastic straw.

3. A dispensing device as set forth in claim 1 where said particulate material is a soluble granular material.

* * * * *